(12) United States Patent
Spitznagel

(10) Patent No.: US 8,322,953 B2
(45) Date of Patent: Dec. 4, 2012

(54) LASER WELD CUTTER

(76) Inventor: Max W. A. Spitznagel, Los Angeles, CA (US)

( * ) Notice: Subject to any disclaimer, the term of this patent is extended or adjusted under 35 U.S.C. 154(b) by 809 days.

(21) Appl. No.: 12/523,562

(22) PCT Filed: Jan. 13, 2008

(86) PCT No.: PCT/US2008/050954
§ 371 (c)(1),
(2), (4) Date: Jul. 17, 2009

(87) PCT Pub. No.: WO2008/089116
PCT Pub. Date: Jul. 24, 2008

(65) Prior Publication Data
US 2010/0088903 A1   Apr. 15, 2010

Related U.S. Application Data

(60) Provisional application No. 60/885,589, filed on Jan. 18, 2007.

(51) Int. Cl.
*B23C 1/20* (2006.01)
(52) U.S. Cl. .................................. 409/139; 409/181
(58) Field of Classification Search .......... 408/110–112; 409/138–140, 175, 178, 180–182; 144/136.95, 144/154.5, 136.1; *B23C 1/20*
See application file for complete search history.

(56) References Cited

U.S. PATENT DOCUMENTS

| | | | | |
|---|---|---|---|---|
| 3,100,408 | A * | 8/1963 | Pufahl | 408/110 |
| 3,288,183 | A * | 11/1966 | Eisbrenner | 144/136.1 |
| 3,312,258 | A * | 4/1967 | Spampinato | 144/251.2 |
| 3,464,295 | A * | 9/1969 | Gallion | 408/112 |
| 4,585,376 | A * | 4/1986 | Davenport et al. | 408/110 |
| 4,742,856 | A * | 5/1988 | Hehr et al. | 144/371 |
| 4,993,897 | A * | 2/1991 | Anderhalden | 409/180 |
| 5,873,686 | A * | 2/1999 | Elmore | 409/182 |
| 6,264,408 | B1 * | 7/2001 | Lung et al. | 409/182 |
| 6,592,307 | B2 * | 7/2003 | Hsieh | 409/139 |
| 2005/0272350 | A1 * | 12/2005 | Harwath-Seyfried | 451/28 |
| 2007/0147970 | A1 * | 6/2007 | Henzler | 409/180 |

FOREIGN PATENT DOCUMENTS

JP   2002086404 A  *  3/2002

* cited by examiner

*Primary Examiner* — Daniel Howell
(74) *Attorney, Agent, or Firm* — Lawrence N. Ginsberg

(57) ABSTRACT

A laser weld cutter assembly that includes a right angle driver comprising: a motor contained within a motor housing; a handle assembly; a burr; and a cutting guide assembly comprising a support element attached to the motor housing, a base plate assembly pivotally attached to the support element, a cutting depth adjustment screw engaged with the base plate assembly and the support element, and a guard attached to the base plate assembly; and wherein the operator positions the output shaft assembly perpendicular to the direction of the weld to be cut, and moves the laser weld cutter assembly in a forward direction away from the operator, the rotation of the burr in the clockwise direction undercutting the material to be removed and providing ease in guiding the burr along the laser weld to be removed.

3 Claims, 3 Drawing Sheets

LASER WELD CUTTER

CROSS REFERENCE TO RELATED APPLICATIONS

This application is a nonprovisional application of, and claims the benefit of the filing date of, U.S. Prov. Pat. Appl. No. 60/885,589, entitled "LASER WELD CUTTER," filed Jan. 18, 2007 by Max W. A. Spitznagel, the entire disclosure of which is incorporated herein by reference for all purposes.

BACKGROUND OF THE INVENTION

1. Field of the Invention

The present invention relates to laser weld cutters and more particularly to a laser weld cutter with enhanced ease in guiding the burr along the laser weld to be removed.

2. Description of the Related Art

Many new automobiles utilize panels that have welded together by the process of laser welding. This process results in a structurally improved product. Manufacturers such as Volkswagen, Audi and Porsche use this process extensively. It is not like a spot-weld, in that it is a continuous weld which has to be ground down/off in order to separate the welded panels. This is very difficult, expensive and time consuming.

U.S. Pat. Publcn. No. 20070147970, entitled "Hand Tool" to Adolf Henzler, discloses a milling tool for opening laser welded connections between thin metal sheets. The milling tool includes a rotary drive, which is used to operate a milling cutter. The head of the milling cutter protrudes through an opening in a base plate that forms an even contact surface for defining the penetration depth of the milling cutter head in the material. In addition, the base plate is provided with a lateral contact surface or contact edge that introduces the reaction force, which originates from the cutting force, directly and rapidly into a contact surface of the bodywork section that is to be treated. It is relatively difficult to cut with the Henzler device because the rotational contact of the burr on the weld (panel) is in the same axis as the weld to be removed. The result of the burr turning in a clockwise direction results in pushing the tool to the right. Its use therefore requires a guide.

It is therefore desired to have a laser weld cutter that can be easily guided and adjusted for varying panel thicknesses.

SUMMARY OF THE INVENTION

In a broad aspect, the present invention is a laser weld cutter assembly that includes a right angle driver comprising a motor housing having a first portion oriented to define a motor axis and a second portion extending from the first portion and oriented along a handle axis generally perpendicular to the first portion. A motor contained within the motor housing includes a motor output shaft assembly rotatably mounted along the motor axis, the direction of rotation being clockwise as viewed through the motor housing toward the output shaft assembly. A handle assembly is connected to a distal end of the second portion and extends along the handle axis. The laser weld cutter assembly includes a cutting guide assembly, comprising a support element securely attached to a distal end of the first portion. A base plate assembly is pivotally attached to the support element. A cutting depth adjustment screw is engaged with the base plate assembly and the support element for adjusting the cutting dept. A guard is attached to the base plate assembly. A burr is securely attached to the output shaft assembly. During use the operator positions the output shaft assembly perpendicular to the direction of the weld to be cut, and moves the laser weld cutter assembly in a forward direction away from the operator, the rotation of the burr in the clockwise direction undercutting the material to be removed and providing ease in guiding the burr along the laser weld to be removed.

Since the burr bit cuts in a right angle to the weld, rotating clockwise, away from the non-ground weld, the tool is easily guided when in operation. The cutting depth can be easily adjusted via the adjustment screw. This is necessary as there are different panel thicknesses and it is not always necessary, or recommended, to grind completely through the material to separate the connected panels.

BRIEF DESCRIPTION OF THE DRAWINGS

The same elements or parts throughout the figures of the drawings are designated by the same reference characters.

DETAILED DESCRIPTION OF THE INVENTION

Figure 1:
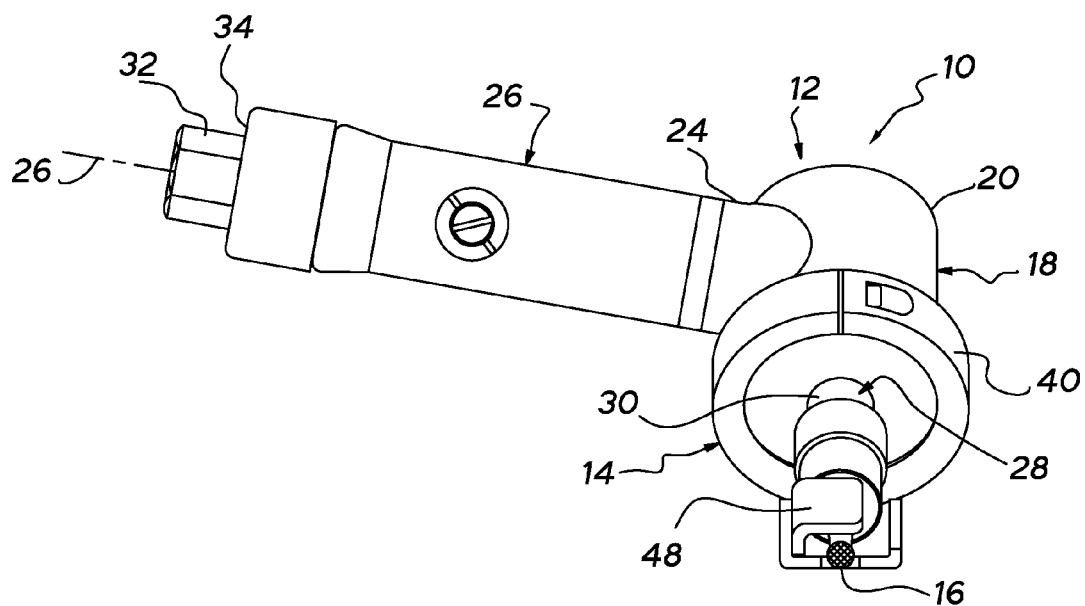
FIG. 1 is a front side perspective view of the laser weld cutter assembly of the present invention, from the cutter side.
Figure 2:
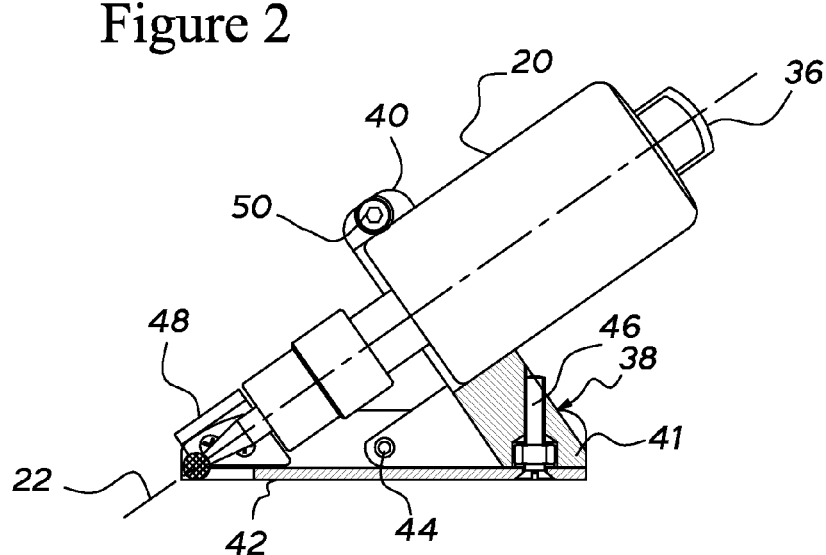
FIG. 2 is a partially cut-away side view of the laser weld cutter assembly, showing the cutting guide assembly partially cutaway.
Figure 3:
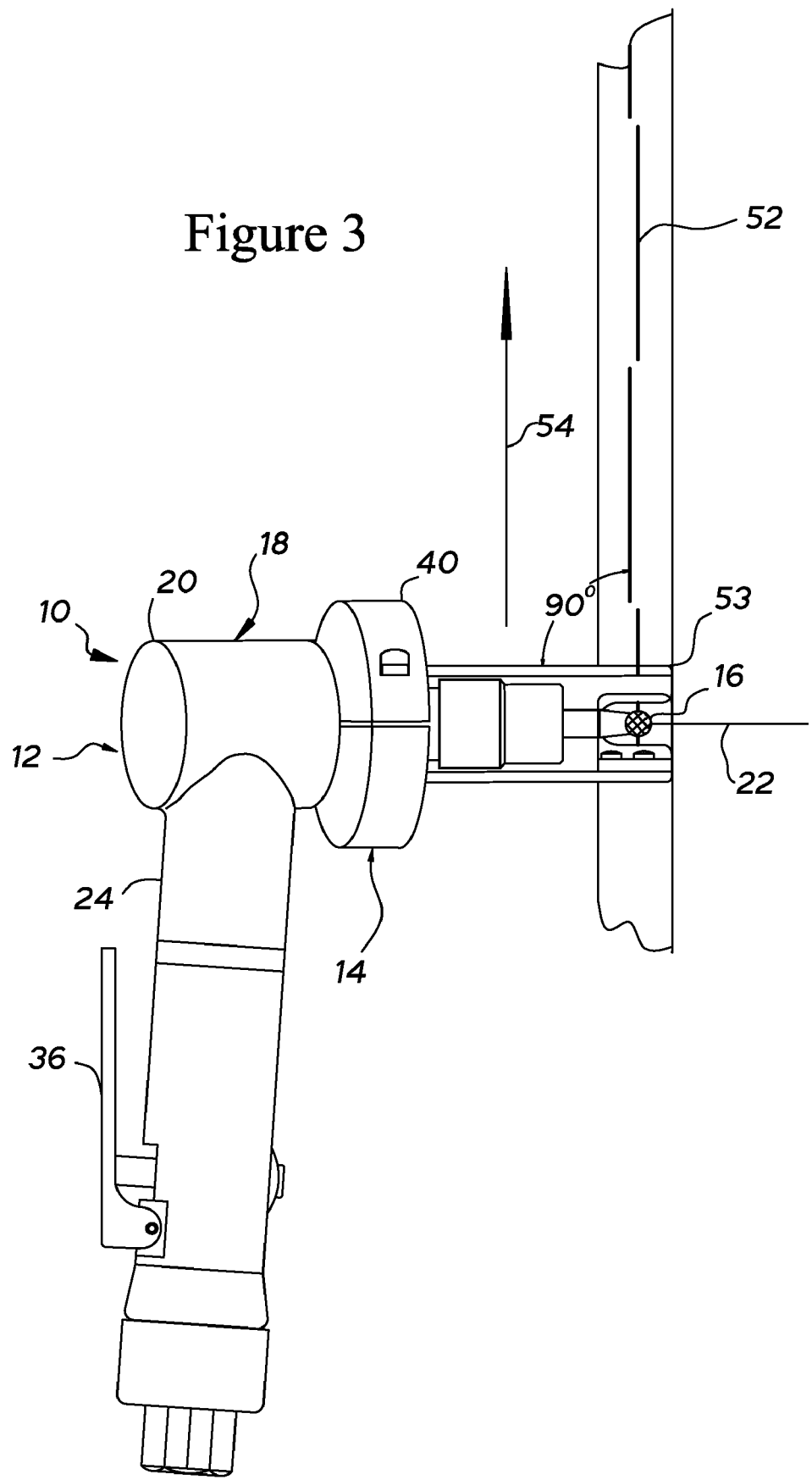
FIG. 3 is a top perspective view of the tool in use relative to a weld to be removed from a panel assembly.

Referring now to the drawings and the characters of reference marked thereon, FIGS. 1-3 illustrate a preferred embodiment of the laser weld cutter assembly of the present invention, designated generally as 10. The laser weld cutter assembly 10 includes a right angle driver, designated generally as 12; a cutting guide assembly, designated generally as 14; and, a burr 16.

The right angle driver 12 includes a motor housing 18 having a first portion 20 oriented to define a motor axis 22 and a second portion 24 extending from the first portion 20 and oriented along a handle axis 26 generally perpendicular to the first portion 20. (As can be best seen in FIG. 3, the first portion 20 and second portion 24 are preferably a few degrees away from the perpendicular to provide ease in handling.)

A motor 28 is contained within the motor housing 18. The motor 28 includes a motor output shaft assembly 30 rotatably mounted along the motor axis 22. The direction of rotation is clockwise as viewed through the motor housing 18 toward the output shaft assembly 30. The motor is typically pneumatic; however, it may be electric or hydraulic.

A handle assembly 26 is connected to a distal end of the second portion 24 and extends along the handle axis 26. The handle assembly 26 includes a fluid input port 32 for receiving working fluid for the motor 28 and a fluid output port (not shown) comprising a plurality of passageways at the back end 34 of the handle assembly 26 for receiving the working fluid from the motor 28. A fluid flow control assembly 36 (see FIG. 3) controls the flow of the working fluid to the motor 28.

The cutting guide assembly 14 includes a support element 38 securely attached to a distal end of the first portion 20. The support element 38 includes a ring portion 40 securely attached to that distal end of the first portion. The support element 38 also includes a base portion 41. A base plate assembly 42 is pivotally attached to the support element 38. The base portion 41 pivotally mates, as indicated by pivot pin 44, with the base plate assembly 42 at an intermediate portion of the base plate assembly 42. A cutting depth adjustment screw 46 is engaged with the base plate assembly 42 and the support element 38 for adjusting the cutting depth. The cutting depth adjustment screw 46 engages the base portion 41 at a rear portion of the base plate assembly 42. A guard 48 is attached to the base plate assembly 42. The ring portion 40 is removable from the first portion 20 via an adjustment screw 50.

Although the support element has been illustrated by the showing of removable ring portion 40, alternatively the support can be cast into the motor housing. A suitable burr 16 is utilized, preferably a round burr.

During operation, as shown in FIG. 3, the operator positions the output shaft assembly 22 perpendicular to the direction of the weld 52 to be cut, and moves the laser weld cutter assembly 10 in a forward direction, as indicated by arrow 54, away from the operator. The rotation of the burr 16 in the clockwise direction undercuts the material to be removed and provides ease in guiding the burr along the laser weld 52 to be removed. Laser welds may be offset, as shown in FIG. 3. The end 53 of the base plate assembly 42 may serve as a guide. Turning the adjustment screw counter clockwise lifts the support element 38 up, forcing it to rotate around the pivot pin 44 and therefore lowering the burr 16 in relation to the base plate assembly 42 resulting in a deeper cut. To lessen the cut this process is reversed.

Figure 4:
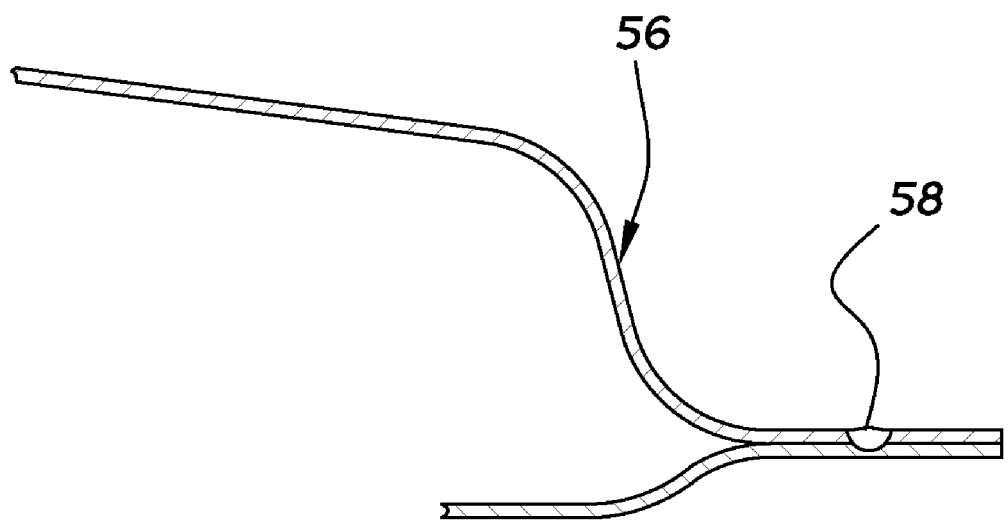
FIG. 4A (Prior Art) is an enlarged cross sectional view of a portion of a panel assembly showing a laser weld.
FIG. 4B shows the weld removed by the laser weld cutter assembly.
Figure 4:
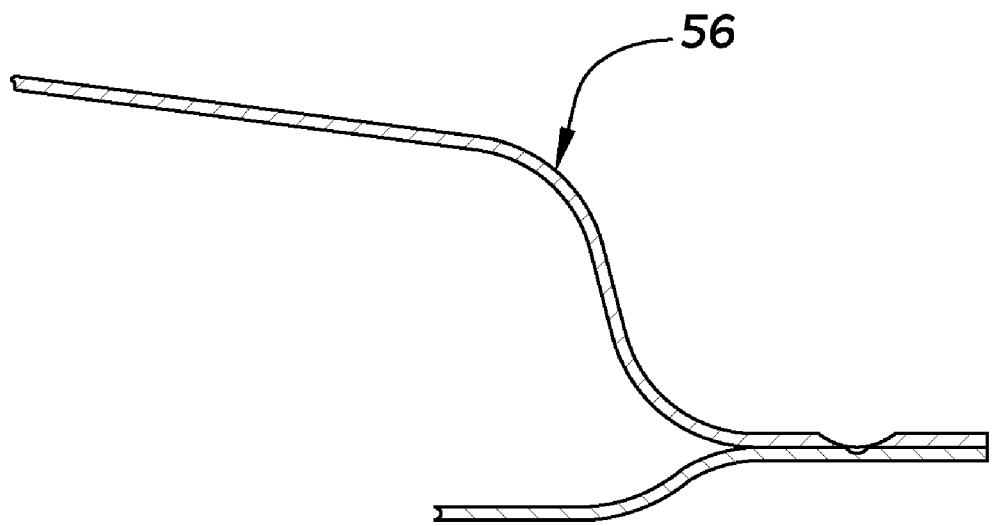

FIG. 4A (Prior Art) shows an enlarged view of a portion of a panel assembly 56 showing a laser weld 58. FIG. 4B shows the weld removed by the laser weld cutter assembly 56.

Other embodiments and configurations may be devised without departing from the spirit of the invention and the scope of the appended claims. For example, even though the invention has been disclosed with respect to use of a right angle driver, the driver may be an in-line driver. In such an instance, the base plate assembly would be mounted perpendicular to the motor axis.

The invention claimed is:

1. A laser weld cutter assembly, comprising:
 a) a right angle driver, comprising:
  i. a motor housing having a first portion oriented to define a motor axis and a second portion extending from said first portion and oriented along a handle axis generally perpendicular to said first portion;
  ii. a motor contained within said motor housing, said motor including a motor output shaft assembly rotatably mounted along said motor axis, the direction of rotation being clockwise as viewed through the motor housing toward the output shaft assembly; and,
  iii. a handle assembly connected to a distal end of said second portion and extending along said handle axis;
 b) a cutting guide assembly, comprising:
  i. a support element securely attached to a distal end of said first portion;
  ii. a base plate assembly pivotally attached to said support element;
  iii. a cutting depth adjustment screw engaged with said base plate assembly and said support element for adjusting the cutting depth; and,
  iv. a guard attached to said base plate assembly;
 c) a burr securely attached to said output shaft assembly, wherein during use the operator positions said output shaft assembly perpendicular to the direction of the weld to be cut, and moves the laser weld cutter assembly in a forward direction away from the operator, the rotation of said burr in said clockwise direction undercutting the material to be removed and providing ease in guiding the burr along the laser weld to be removed.

2. The laser weld cutter assembly of claim 1, wherein said support element, comprises:
 a) a ring portion securely attached to said distal end of said first portion; and,
 b) a base portion for pivotally mating with said base plate assembly at an intermediate portion of said base plate assembly, said cutting depth adjustment screw engaging said base portion at a rear portion of said base plate assembly.

3. The laser weld cutter assembly of claim 1, wherein said handle assembly, comprises:
 a) a fluid input port for receiving working fluid for said motor;
 b) a fluid output port for receiving the working fluid from said motor; and;
 c) a fluid flow control assembly for controlling the flow of said working fluid to said motor.

* * * * *